United States Patent
Zhou et al.

(10) Patent No.: US 12,379,206 B2
(45) Date of Patent: Aug. 5, 2025

(54) METHOD FOR IN-SITU NON-CONTACT DETECTION OF SYMMETRY ERROR OF KEYWAY LOCATED ON SHAFT-TYPE WORKPIECE

(71) Applicant: JIANGSU UNIVERSITY OF SCIENCE AND TECHNOLOGY, Zhenjiang (CN)

(72) Inventors: Honggen Zhou, Zhenjiang (CN); Guochao Li, Zhenjiang (CN); Li Sun, Zhenjiang (CN); Ying Tang, Zhenjiang (CN); Baojiang Dong, Zhenjiang (CN); Xiaoyan Guan, Zhenjiang (CN); Xiaona Shi, Zhenjiang (CN); Hengheng Wu, Zhenjiang (CN); Qiulin Hou, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 183 days.

(21) Appl. No.: 18/225,187

(22) Filed: Jul. 24, 2023

(65) Prior Publication Data
US 2024/0003681 A1    Jan. 4, 2024

Related U.S. Application Data

(63) Continuation of application No. PCT/CN2023/077576, filed on Feb. 22, 2023.

(30) Foreign Application Priority Data

Sep. 30, 2022 (CN) .......................... 2022112070724

(51) Int. Cl.
*G01B 11/24* (2006.01)
*G01B 11/00* (2006.01)

(52) U.S. Cl.
CPC ............ *G01B 11/24* (2013.01); *G01B 11/002* (2013.01)

(58) Field of Classification Search
CPC ....... G01B 11/002; G01B 11/24; G01B 11/03; G01B 11/26; B23Q 17/2471; G06F 17/10; G16Y 10/75; G16Y 30/10; H04L 63/062; H04L 63/068; H04L 9/3247; H04L 9/3263; H04W 84/18
USPC ......................................................... 356/601
See application file for complete search history.

(56) References Cited

FOREIGN PATENT DOCUMENTS

CN            111561882 A   *   8/2020   ............. G01B 11/26

* cited by examiner

*Primary Examiner* — Tri T Ton
(74) *Attorney, Agent, or Firm* — CBM PATENT CONSULTING, LLC (57) ABSTRACT

A method for in-situ non-contact detection of a symmetry error of a keyway located on the shaft-type workpiece includes the following steps: establishing a detection system and a system calculation coordinate system; controlling rotation of a shaft-type workpiece, continuously acquiring data of a detection part by means of a laser displacement sensor, and calculating and analyzing the acquired data to obtain a symmetry error of a detection section; and moving the laser displacement sensor in an axis direction, and calculating symmetry errors of a plurality of sections of the keyway, to obtain a symmetry error of the keyway located on the shaft-type workpiece.

5 Claims, 5 Drawing Sheets

METHOD FOR IN-SITU NON-CONTACT DETECTION OF SYMMETRY ERROR OF KEYWAY LOCATED ON SHAFT-TYPE WORKPIECE

CROSS-REFERENCE TO RELATED APPLICATIONS

This application is the US Continuation Application of International Application No. PCT/CN2023/077576 filed on 22 Feb. 2023 which designated the U.S. and claims priority to Chinese Application No. CN2022112070724 filed on 30 Sep. 2022, the entire contents of each of which are hereby incorporated by reference.

TECHNICAL FIELD

The present invention relates to a method for detection of shaft workpieces in the processing field, and particularly relates to a method for in-situ non-contact detection of a symmetry error of a keyway located on the shaft-type workpiece.

BACKGROUND ART

Key transmission is an important form of mechanical transmission. A shaft key is usually made of steel and is placed or installed between a paired shaft and an axial hub of the component to achieve the purpose of transmitting motion and preventing relative sliding; and the keyway is a groove on the shaft or the hub that is configured to receive a key and securely lock an assembly.

Symmetry error is one of the key factors affecting the key transmission performance, therefore, symmetry is an important index for evaluating the quality of a keyway. The symmetry error should not be large, because a large error will cause stress imbalance of a transmission mechanism and reduce the alignment accuracy. In order to ensure the safety of key transmission of shaft parts, it is necessary to strictly test the symmetry of the keyway.

At present, the commonly used keyway symmetry detection method mainly includes the following steps: placing a workpiece on a V-shaped block to simulate the reference axis of a shaft, inserting a gauge block into a keyway, simulating the central plane of the measured keyway with the gauge block, then aligning the upper plane of the gauge block to be parallel to the measuring table thereof, respectively measuring the distance between the two ends of the gauge block, measuring again after turning over at 180°, and finally substituting the measured data into the corresponding formula to calculate the symmetry error. Another detection method is to use a three-coordinate measuring instrument, but the detection cost is high and the detection time is long. The existing measuring tool contact measurement method has the defects that the surface of the part is easily scratched and the measurement accuracy and automation degree are low, so that it cannot meet the needs of high-precision, high-efficiency, and large-scale production today.

Therefore, it is urgent to solve the above problems.

SUMMARY

An objective of the present invention is to provide a method for in-situ non-contact detection of a symmetry error of a keyway located on the shaft-type workpiece. The method improves the accuracy and automation of keyway detection, realizes in-situ non-contact detection of keyway processing, and provides a guarantee for high-precision keyway manufacturing.

The present invention discloses a method for in-situ non-contact detection of a symmetry error of a keyway located on the shaft-type workpiece. The method includes the following steps:

S1: establishing a detection system, where the detection system includes a guide rail located on the upper side of a machine tool, a laser displacement sensor that is installed on the guide rail and can move laterally along the guide rail, a lateral moving device that is installed on the guide rail to drive the laser displacement sensor to move, a longitudinal moving device that is located on both sides of the guide rail and configured to drive the longitudinal movement of the guide rail, and a machine tool for clamping shaft-type workpieces; measuring with the laser displacement sensor in a vertical direction, first moving the laser displacement sensor along the guide rail to a non-keyway section of the shaft-type workpiece that refers to a part of the shaft-type workpiece in radial direction where there is no keyway, a keyway is a structural feature for connecting shafts and hubs to ensure torque transmission, making the guide rail move horizontally in a direction perpendicular to the axis of the workpiece through the moving devices at both ends of the guide rail, comparing the values of measuring during the movement, adjusting the laser displacement sensor to the position of the maximum measured value, that is, a position on the axis of the shaft-type workpiece, and then moving the laser displacement sensor along the guide rail to the top of the keyway of the shaft-type workpiece; establishing a system calculation coordinate system, taking the theoretical point of intersection between the laser and the axis of the shaft-type workpiece as the origin O, the theoretical point is an intersection point between a laser beam's line of propagation and the axis of the shaft-type workpiece, the axis of the shaft-type workpiece as the Z-axis, and the vertical upwards direction of a straight line where the laser is located as the positive direction of the Y-axis, using the right-hand rule to determine the X-axis, establishing the detection coordinate system O-XYZ, and determining the section detected by the laser displacement sensor as the XOY plane;

S2: controlling the machine tool to rotate at a given speed, driving the shaft-type workpiece to rotate at a constant speed, acquiring the real-time detection data of the shaft-type workpiece through the laser displacement sensor, and converting the data to obtain the measured value y on the Y-axis;

On the rectangular coordinate system X-O-Y of the section, when the bottom of the keyway is horizontal, the mathematical model for the cross-section contour line of the keyway can be expressed as:

$$\rho(\theta) = \begin{cases} \dfrac{R-b}{\sin\theta}, & \dfrac{\pi}{2} - \arcsin\dfrac{a+\delta_0}{R} < \theta < \dfrac{\pi}{2} + \arcsin\dfrac{a+\delta_0}{R} \\ R, & \text{Other} \end{cases} \quad (2)$$

where R is the radius of the shaft, b is the depth of the keyway, $\theta$ is the polar angle, $\rho$ is the polar radius, $\rho(\theta)$ is a function of polar radius and polar angle, 2a is the width of the keyway, $\delta_0$ is the symmetry error of the keyway actually existing in this section, and $\delta_0$ is 0 when there is no symmetry error;

Under the rectangular coordinate system X-O-Y of the section, the coordinates of a point $(x_0, y_0)$ on the contour after rotating the angle $\alpha$ counterclockwise around the origin are (x, y), and the conversion formula is as follows:

$$\begin{bmatrix} x \\ y \end{bmatrix} = \begin{bmatrix} \cos\alpha & -\sin\alpha \\ \sin\alpha & \cos\alpha \end{bmatrix} \begin{bmatrix} x_0 \\ y_0 \end{bmatrix} \quad (3)$$

the detection trajectory equation obtained by the laser displacement sensor can be regarded as the intersection curve of the original curve equation (2) with the Y-axis, the coordinates of the intersection points between the keyway cross-sectional profile line and the Y-axis form an intersection curve, and the model expression is as follows:

$$\begin{cases} \begin{bmatrix} x \\ y \end{bmatrix} = \begin{bmatrix} \cos\alpha & -\sin\alpha \\ \sin\alpha & \cos\alpha \end{bmatrix} \begin{bmatrix} \rho(\theta)\cos\theta \\ \rho(\theta)\sin\theta \end{bmatrix} \\ x = 0 \end{cases} \quad (4)$$

two numerical mutation points A and B existing in the detection trajectory are the left and right edge points of the keyway, and their rotation angles $\alpha$ are respectively set as $\alpha_1$ and $\alpha_2$ and $\alpha_1 < \alpha_2$; if $\alpha_0$ is the rotation angle when the value in the trajectory is the smallest, then the bottom of the keyway is just parallel to the X-axis at this moment, that is, regardless of the initial position of the axis, if the axis is rotated counterclockwise by an angle of $\alpha_0$, the bottom of the keyway can be kept horizontal; at this position, the coordinates for the two ends of the keyway can be calculated; at this time, points A and B are distributed on both sides of the y-axis, and the calculation formulas of the abscissa are respectively as follows:

$$x_A = R\sin(\alpha_1 - \alpha_0)$$

$$x_B = R\sin(\alpha_2 - \alpha_0) \quad (5)$$

$x_A$ is the abscissa of the point A, and $x_B$ is the abscissa of the point B;

the abscissa of the central point of the keyway is calculated according to the abscissas of the points A and B, the difference between the abscissa and the ideal coordinate is the symmetry error $\delta_1$, and the calculation formula is as follows:

$$\delta_1 = \frac{x_A + x_B}{2} - 0 \quad (6)$$

when the laser displacement sensor is installed, there exists a positioning error along the X direction, and when the laser displacement sensor is offset by a distance l in the X direction, a detection line becomes x=l in the rectangular coordinate system X-O-Y of the section; the trajectory of the keyway section is determined by the rotation angle $\alpha_0$ where the points A and B are detected by the detection light; according to the theory of space geometry, the trajectory of the non-keyway section remains unchanged, and the value of the detection line in the formula (4) is changed from x=0 to x=l, to obtain the rotation angles of the points A and B; at this time, an equation of the trajectory in 360 degrees can be expressed as follows:

$$\rho(\theta) = \begin{cases} \dfrac{R-b}{\sin\theta}, & \alpha_1' < \theta < \alpha_2' \\ R, & \text{Other} \end{cases} \quad (7)$$

$a_1'$ and $a_2'$ are the rotation angles when the laser displacement sensor detects the vertices of the edges of two keyways respectively, R is a variable of the radius of the shaft, b is the depth of the keyway, and the detection curve model after the sensor is offset can be obtained through simultaneous connection;

when they value is R-b and the point after the lowest point is a horizontal time point, the rotation angle is $a_0'$;

the laser displacement sensor has a deviation along the x-axis direction, and its measured maximum and minimum values are changed; if the maximum value detected after the offset is $R_{max}$, $R_{max}$ will be smaller than the section radius R, an offset in the rotation angles of the points A and B will be compensated, and the compensation formula is as follows:

$$rs = \arccos\frac{R_{max}}{R} \quad (8)$$

rs is the compensation angle;

the compensation angle is used to eliminate the influence from the horizontal offset of the laser displacement sensor, and the formula for calculating the abscissas of the points A and B is as follows:

$$x_A = R\sin(\alpha_1' - \alpha_0' + rs)$$

$$x_B = R\sin(\alpha_2' - \alpha_0' + rs) \quad (9)$$

$x_A$ and $x_B$ are substituted into the formula (6) to obtain the calculated value of the symmetry error of the section after eliminating the sensor offset error;

S3: moving the laser displacement sensor on the keyway along the Z-axis direction, repeating the detection several times at different positions, and calculating the symmetry errors of n sections, where the maximum error is the symmetry error of the keyway, and the expression is as follows:

$$\delta = \max(\delta_i), i=1,2,\ldots n \quad (10)$$

$\delta_i$ is the calculated symmetry error of the $i^{th}$ section, and $\delta$ is the symmetry error of the shaft keyway.

The method of acquiring the real-time detection data of the shaft-type workpiece through the laser displacement sensor and converting the data to obtain the measured value y on the Y-axis in S2 is as follows:

the detection data of the laser displacement sensor is made corresponding to the O-XYZ coordinate system, and the laser displacement sensor is located on the axis of the keyway section; assuming that the measured value obtained by the laser displacement sensor when the workpiece rotates by 360 degrees is $y_c$, the maximum value is $y_{cmax}$, the minimum value is $y_{cmin}$ (excluding the value of the keyway section), and the value of the detection data corresponding to the Y axis is y, then the corresponding relationship is as follows:

$$y = y_c - \frac{y_{cmax} - y_{cmin}}{2} \quad (11)$$

Preferably, the lateral moving device includes a horizontal screw rod that is arranged parallelly below the guide rail, a horizontal motor that is connected to the guide rail and configured to drive the horizontal screw rod to rotate, the laser displacement sensor is fixed on a ball nut seat of the horizontal screw rod, and the horizontal motor drives the horizontal screw rod to rotate, so as to drive the laser displacement sensor to move laterally along the guide rail.

Further, the longitudinal moving device includes two parallel longitudinal screw rods symmetrically arranged on both sides of the guide rail and a longitudinal motor that is located at the end of the longitudinal screw rod and configured to drive the rotation of the longitudinal screw rod, the two ends of the guide rail are fixed on the ball nut seat of the longitudinal screw rod on both sides, and the longitudinal motor synchronously drives the rotation of the longitudinal screw rods on both sides, and drives the guide rail to move along the longitudinal screw rod.

Furthermore, the machine tool includes a chuck for clamping the shaft-type workpieces and a tip for tightening the shaft-type workpieces, and the rotation of the chuck is controlled to drive the shaft-type workpieces to rotate at a constant speed.

Compared with the prior art, the present invention has the following significant advantages and beneficial effects:

Firstly, the present invention uses a high-precision sensor to detect the contour data, and calculates the symmetry error according to the contour trajectory data, thus avoiding the problem that the introduction of measurement reference for a traditional V-shaped block or measuring block easily causes additional errors; and at the same time, the present invention takes into account the objectively existing positioning error of the laser displacement sensor, and eliminates such error in the calculation process; the present invention enables the high-precision machining accuracy detection directly on the processing site, and the non-contact measurement avoids the damage to the processing workpieces and the wear and tear of the detecting instrument, as well as the positioning error caused by repeated clamping; compared with other detection methods, the present invention features high reliability, high detection efficiency and short detection duration, and enables in-situ non-contact detection of shaft-type workpieces of various sizes, without need of a large number of stationary fixtures (indicating a high degree of freedom), so that the method of the present invention can be extensively applied.

DETAILED DESCRIPTION OF THE EMBODIMENTS

The technical solution of the present invention will be further described below with reference to the accompanying drawings.

Figure 2:
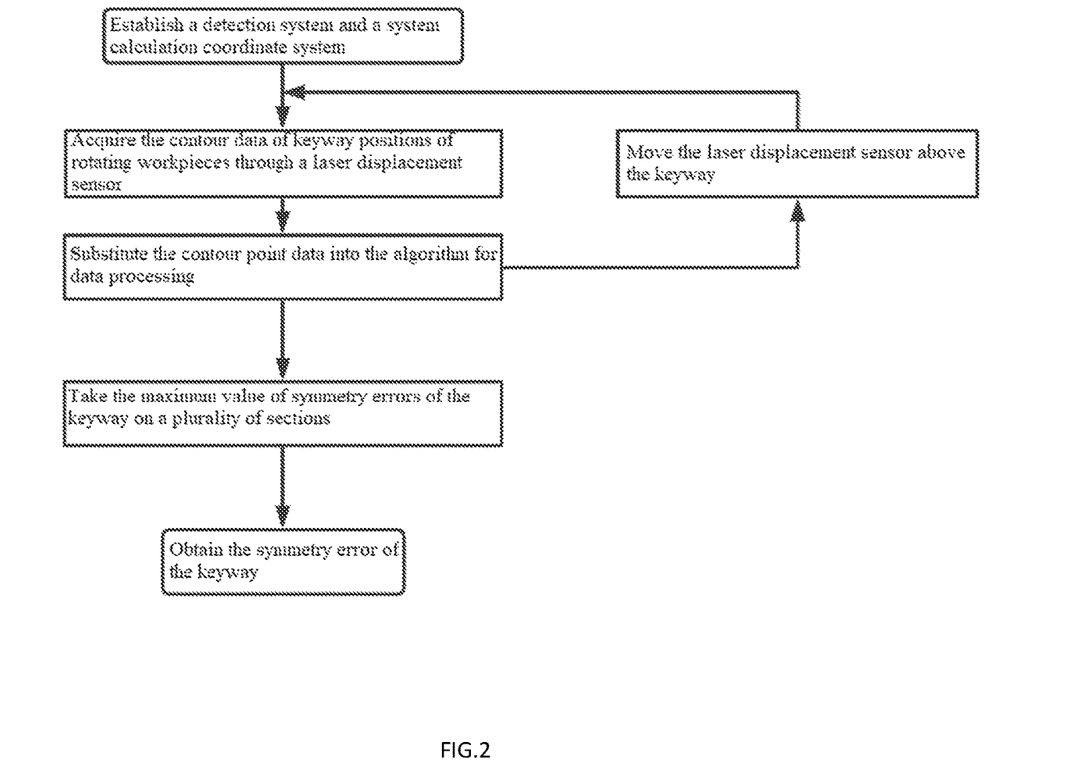
FIG. 2 is a flow chart of the present invention.
Figure 3:
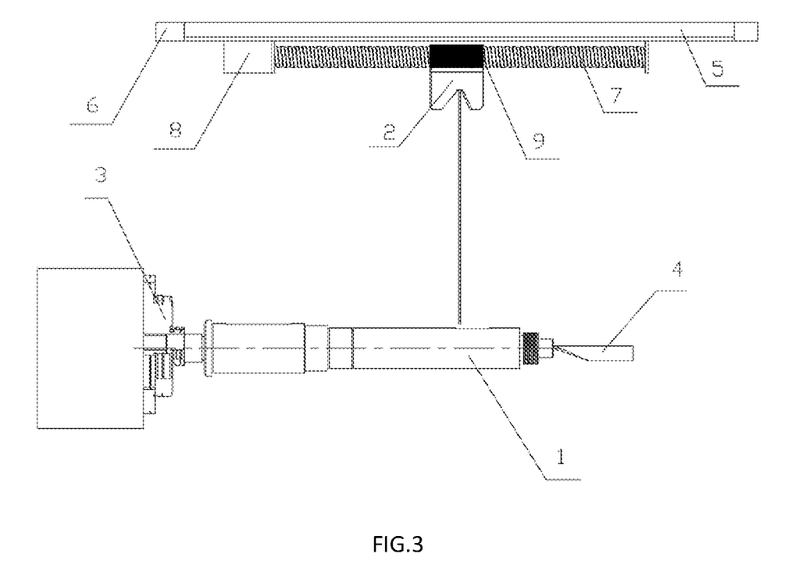
FIG. 3 is a structural schematic diagram of a detection system of the present invention.
Figure 4:
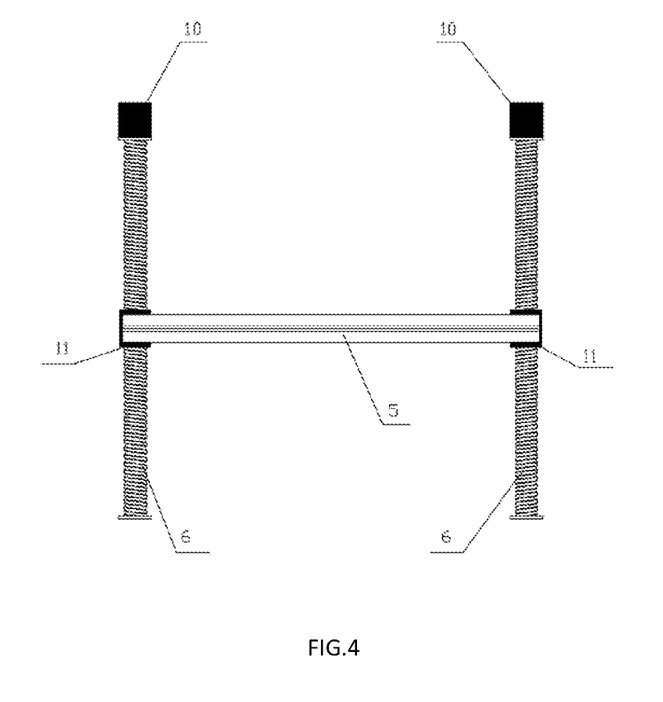
FIG. 4 is a top view of a guide rail in the present invention.
Figure 5:
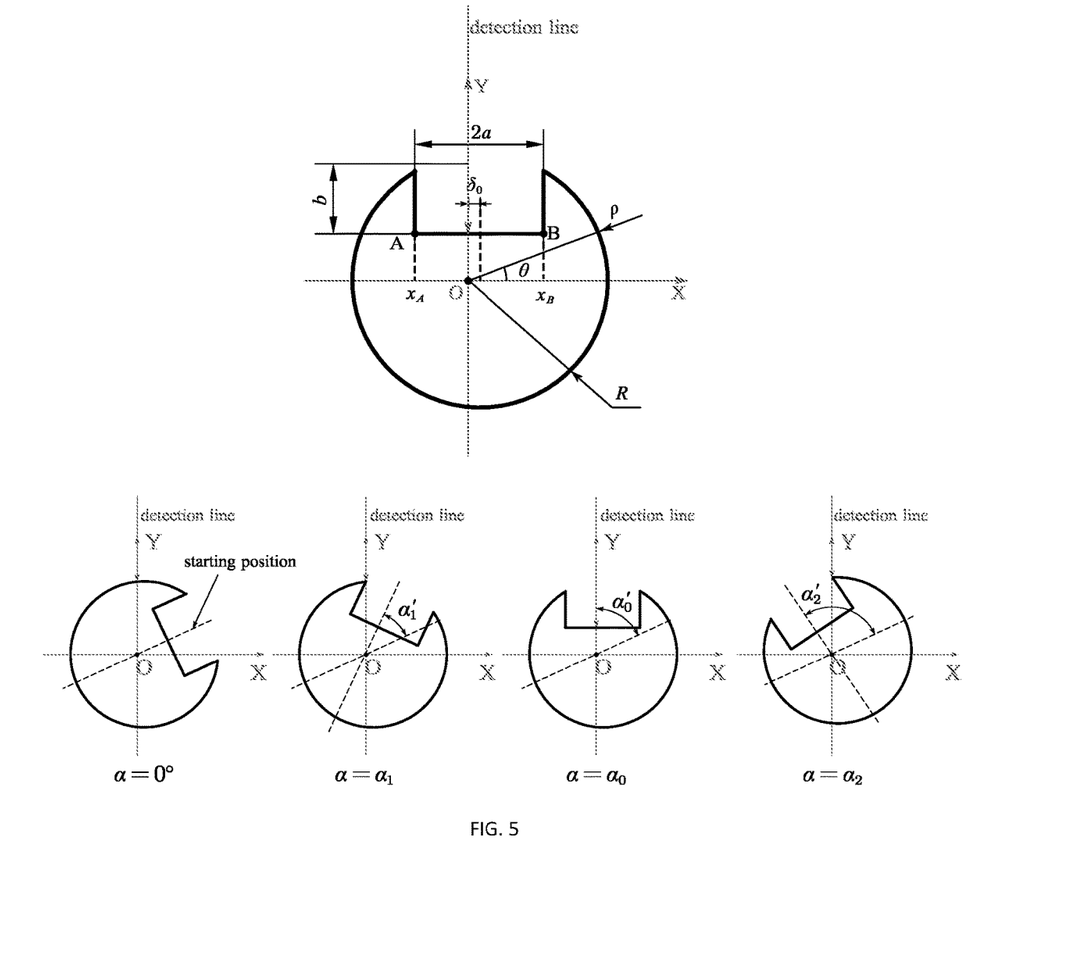
FIG. 5 shows the coordinate system X-O-Y, when the detection line is x=0.

As shown in FIG. 2, the present invention discloses a method for in-situ non-contact detection of a symmetry error of a keyway located on the shaft-type workpiece. The method includes the following steps:

S1: establishing a detection system, where the detection system includes a guide rail located on the upper side of a machine tool, a laser displacement sensor that is installed on the guide rail and can move laterally along the guide rail, a lateral moving device that is installed on the guide rail to drive the laser displacement sensor to move, a longitudinal moving device that is located on both sides of the guide rail and configured to drive the longitudinal movement of the guide rail, and a machine tool for clamping shaft-type workpieces; the lateral moving device includes a horizontal screw rod that is arranged parallelly below the guide rail, a horizontal motor that is connected to the guide rail and configured to drive the horizontal screw rod to rotate, the laser displacement sensor is fixed on a ball nut seat of the horizontal screw rod, and the horizontal motor drives the horizontal screw rod to rotate, so as to drive the laser displacement sensor to move laterally along the guide rail. The longitudinal moving device includes two parallel longitudinal screw rods symmetrically arranged on both sides of the guide rail and a longitudinal motor that is located at the end of the longitudinal screw rod and configured to drive the rotation of the longitudinal screw rod, the two ends of the guide rail are fixed on the ball nut seat of the longitudinal screw rod on both sides, and the longitudinal motor synchronously drives the rotation of the longitudinal screw rods on both sides, and drives the guide rail to move along the longitudinal screw rod. The machine tool includes a chuck for clamping the shaft-type workpieces and a tip for tightening the shaft-type workpieces. The following steps are adopted: measuring with the laser displacement sensor in a vertical direction, first moving the laser displacement sensor along the guide rail to a non-keyway section of the shaft-type workpiece, making the guide rail move horizontally in a direction perpendicular to the axis of the workpiece through the moving devices at both ends of the guide rail, comparing the values of measuring during the movement, adjusting the laser displacement sensor to the position of the maximum measured value, that is, a position on the axis of the shaft-type workpiece, and then moving the laser displacement sensor along the guide rail to the top of the keyway of the shaft-type workpiece; establishing a system calculation coordinate system, taking the theoretical point of intersection between the laser and the axis of the shaft-type workpiece as the origin O, the axis of the shaft-type workpiece as the Z-axis, and the vertical upwards direction of a straight line where the laser is located as the positive direction of the Y-axis, using the right-hand rule to determine the X-axis, establishing the detection coordinate system O-XYZ, and determining the section detected by the laser displacement sensor as the XOY plane;

S2: controlling the chuck of the machine tool to rotate at a given speed, driving the shaft-type workpiece to rotate at a constant speed, acquiring the real-time detection data of the shaft-type workpiece through the laser displacement sensor, and converting the data to obtain the measured value Y on the Y-axis;

the method of acquiring the real-time detection data of the shaft-type workpiece through the laser displacement sensor and converting the data to obtain the measured value Y on the Y-axis is as follows:

the detection data of the laser displacement sensor is made corresponding to the O-XYZ coordinate system, and the laser displacement sensor is located on the axis of the keyway section; assuming that the measured value obtained by the laser displacement sensor when the workpiece rotates by 360 degrees is $y_c$, the maximum value is $y_{cmax}$, the minimum value is $y_{cmin}$ (excluding the value of the keyway section), and the value of the detection data corresponding to the Y axis is y, then the corresponding relationship is as follows:

$$y = y_c - \frac{y_{cmax} - y_{cmin}}{2} \quad (1)$$

on the rectangular coordinate system X-O-Y of the section, when the bottom of the keyway is horizontal, the mathematical model for the cross-section contour line of the keyway can be expressed as:

$$\rho(\theta) = \begin{cases} \frac{R-b}{\sin\theta}, & \frac{\pi}{2} - \arcsin\frac{a+\delta_0}{R} < \theta < \frac{\pi}{2} + \arcsin\frac{a+\delta_0}{R} \\ R, & \text{Other} \end{cases} \quad (2)$$

where R is the radius of the shaft, b is the depth of the keyway, θ is the polar angle, ρ is the polar radius, 2a is the width of the keyway, $\delta_0$ is the symmetry error of the keyway actually existing in this section, and $\delta_0$ is 0 when there is no symmetry error;

under the rectangular coordinate system X-O-Y of the section, the coordinates of a point $(x_0, y_0)$ on the contour after rotating the angle α counterclockwise around the origin are (x, y), and the conversion formula is as follows:

$$\begin{bmatrix} x \\ y \end{bmatrix} = \begin{bmatrix} \cos\alpha & -\sin\alpha \\ \sin\alpha & \cos\alpha \end{bmatrix} \begin{bmatrix} x_0 \\ y_0 \end{bmatrix} \quad (3)$$

the detection trajectory equation obtained by the laser displacement sensor can be regarded as the original curve equation (2) where the curve intersects with the Y-axis at a positive value point after rotation by 360 degrees, and the model expression is as follows:

$$\begin{cases} \begin{bmatrix} x \\ y \end{bmatrix} = \begin{bmatrix} \cos\alpha & -\sin\alpha \\ \sin\alpha & \cos\alpha \end{bmatrix} \begin{bmatrix} \rho(\theta)\cos\theta \\ \rho(\theta)\sin\theta \end{bmatrix} \\ x = 0 \end{cases} \quad (4)$$

two numerical mutation points A and B existing in the detection trajectory are the left and right edge points of the keyway, and their rotation angles α are respectively set as $\alpha_1$ and $\alpha_2$ and $\alpha_1 < \alpha_2$; if $\alpha_0$ is the rotation angle when the value in the trajectory is the smallest, then the bottom of the keyway is just parallel to the X-axis at this moment, that is, regardless of the initial position of the axis, if the axis is rotated counterclockwise by an angle of $\alpha_0$, the bottom of the keyway can be kept horizontal; at this position, the coordinates for the two ends of the keyway can be calculated; at this time, points A and B are distributed on both sides of the y-axis, and the calculation formulas of the abscissa are respectively as follows:

$$x_A = R\sin(\alpha_1 - \alpha_0)$$

$$x_B = R\sin(\alpha_2 - \alpha_0) \quad (5)$$

Figure 6:
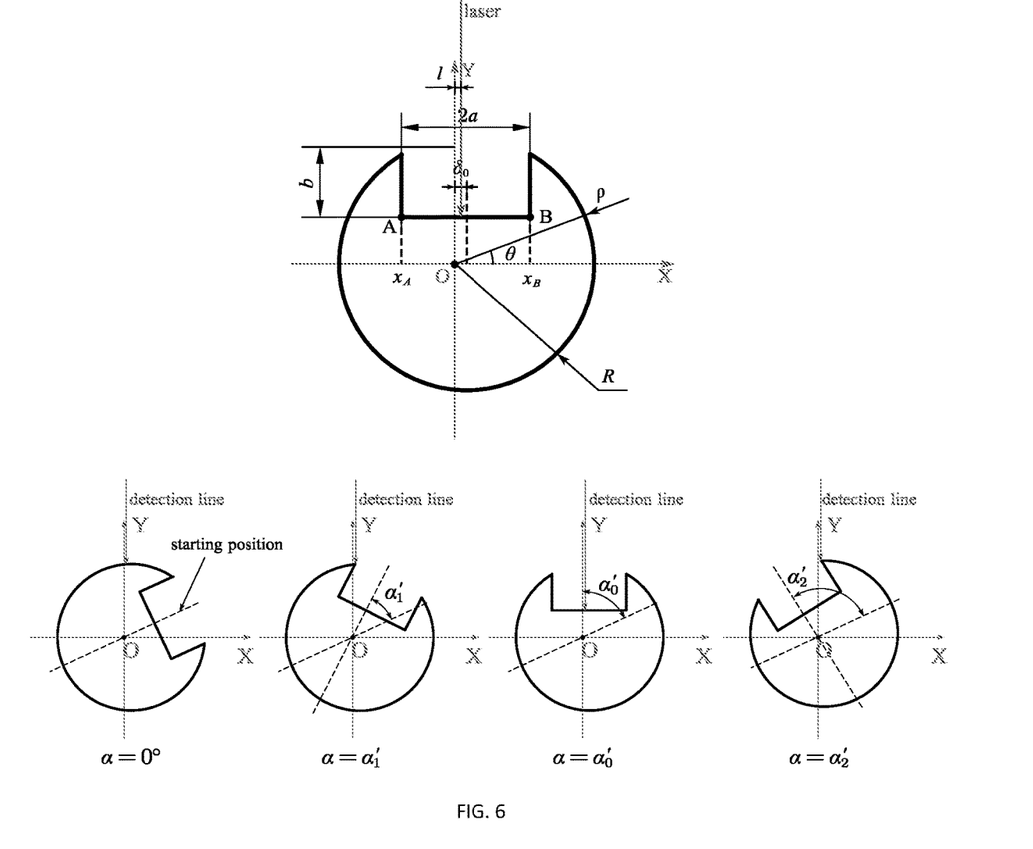
FIG. 6 shows the coordinate system X-O-Y, when the detection line is x=1.

$x_A$ is the abscissa of the point A, and $x_B$ is the abscissa of the point B;

the abscissa of the central point of the keyway is calculated according to the abscissas of the points A and B, the difference between the abscissa and the ideal coordinate is the symmetry error, and the calculation formula is as follows:

$$\delta_1 = \frac{x_A + x_B}{2} - 0 \quad (6)$$

when the laser displacement sensor is installed, there exists a positioning error along the X direction, and when the laser displacement sensor is offset by a distance l in the x direction, a detection line becomes x=l in the rectangular coordinate system X-O-Y of the section; the trajectory of the keyway section is determined by the rotation angle where the points A and B are detected by the detection light; according to the theory of space geometry, the trajectory of the non-keyway section remains unchanged, and the value of the detection line in the formula (4) is changed from x=0 to x=l, to obtain the rotation angles of the points A and B; at this time, an equation of the trajectory in 360 degrees can be expressed as follows:

$$\rho(\theta) = \begin{cases} \frac{R-b}{\sin\theta}, & \alpha_1' < \theta < \alpha_2' \\ R, & \text{Other} \end{cases} \quad (7)$$

$\alpha_1'$ and $\alpha_2'$ are the rotation angles when the laser displacement sensor detects the vertices of the edges of two keyways respectively, and the detection curve model after the sensor is offset can be obtained through simultaneous connection;

when the y value is R-b and the point after the lowest point is a horizontal time point, the rotation angle is $\alpha_0'$;

the laser displacement sensor has a deviation along the x-axis direction, and its measured maximum and minimum values are changed; if the maximum value detected after the offset is $R_{max}$, $R_{max}$ will be smaller than the section radius R, an offset in the rotation angles of the points A and B will be compensated, and the compensation formula is as follows:

$$rs = \arccos\frac{R_{max}}{R} \quad (8)$$

rs is the compensation angle;

the compensation angle is used to eliminate the influence from the horizontal offset of the laser displacement sensor, and the formula for calculating the abscissas of the points A and B is as follows:

$$x_A = R\sin(\alpha_1' - \alpha_0' + rs)$$

$$x_B = R\sin(\alpha_2' - \alpha_0' + rs) \quad (9)$$

$x_A$ and $x_B$ are substituted into the formula (6) to obtain the calculated value of the symmetry error of the section after eliminating the sensor offset error;

S3: moving the laser displacement sensor on the keyway along the Z-axis direction, repeating the detection several times at different positions, and calculating the symmetry errors of n sections, where the maximum error is the symmetry error of the keyway, and the expression is as follows:

$$\delta = \max(\delta_i), \ i = 1, 2, \ldots n \quad (10)$$

$\delta_i$ is the calculated symmetry error of the $i^{th}$ section, and $\delta$ is the symmetry error of the shaft keyway.

Example 1

Taking a shaft produced by a diesel engine factory as an example, the diameter of a keyway section is 40 mm, the groove width thereof is 12 mm, and the symmetry tolerance of the keyway is 0.015 mm, which is actually 0.010 mm. According to the size of a camshaft to be detected, an LK-H150 laser displacement sensor is selected as the detection device, which has an accuracy of 0.25 um and a measurable range of 150±40 mm.

Figure 1:
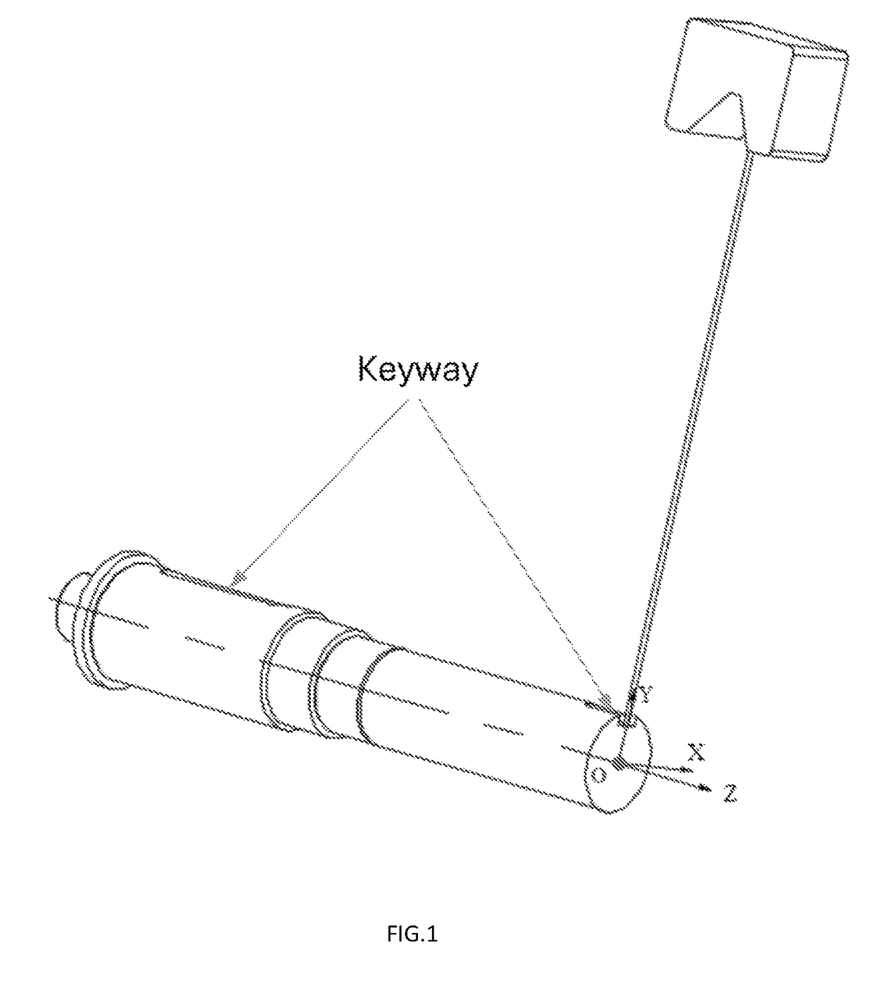
FIG. 1 is a schematic diagram of a calculation coordinate system of the present invention.

A shaft-type workpiece 1 is fixed by a chuck 3 and a tip 4 on a machine tool. First, a detection system needs to be established. It is worth noting that the position of a laser displacement sensor 2 should be adjusted so that it is located above the axis of the shaft-type workpiece 1 to be measured as much as possible, and also a detection system coordinate system should be established. As shown in FIG. 1, the core is to represent the cross-sectional profile of the keyway. The rotation of the chuck 3 is controlled to drive the shaft-type workpiece 1 to rotate at a constant speed, the rotation speed is an important variable for calculation, and the laser displacement sensor 2 acquires the data of the rotating part continuously, performs point calculation based on the acquired data, and substitutes the data into the calculation formula to obtain the symmetry error of the section keyway. If the symmetry error of a section is known, and the overall symmetry error of the keyway is required, then it is necessary to move the laser displacement sensor 2 along a guide rail 5, to calculate the keyway symmetry errors of a plurality of sections, and to take the maximum value as the overall keyway symmetry error.

As shown in FIG. 1 and FIG. 2, the present invention discloses a method for efficient in-situ non-contact detection of a symmetry error of a keyway located on the shaft-type workpiece. The method includes the following steps:

S1: as shown in FIG. 3 and FIG. 4, a detection system is established, where the detection system includes a guide rail 5 located on the upper side of a machine tool, a laser displacement sensor 2 that is installed on the guide rail and can move laterally along the guide rail, a lateral moving device that is installed on the guide rail to drive the laser displacement sensor to move, a longitudinal moving device that is located on both sides of the guide rail and configured to drive the longitudinal movement of the guide rail, and a machine tool for clamping shaft-type workpieces; the lateral moving device includes a horizontal screw rod 7 that is arranged parallelly below the guide rail, a horizontal motor 8 that is connected to the guide rail and configured to drive the horizontal screw rod to rotate, the laser displacement sensor 2 is fixed on a ball nut seat 9 of the horizontal screw rod 7, and the horizontal motor 8 drives the horizontal screw rod 7 to rotate, so as to drive the laser displacement sensor 2 to move laterally along the guide rail 5. Further, the longitudinal moving device includes two parallel longitudinal screw rods 6 symmetrically arranged on both sides of the guide rail and a longitudinal motor 10 that is located at the end of the longitudinal screw rod and configured to drive the rotation of the longitudinal screw rod, the two ends of the guide rail 5 are fixed on the ball nut seat 11 of the longitudinal screw rod 6 on both sides, and the longitudinal motor 10 synchronously drives the rotation of the longitudinal screw rods 6 on both sides, and drives the guide rail 5 to move along the longitudinal screw rod 6.

The shaft-type workpiece is fixed by the chuck 3 and the tip 4 of the machine tool, and the laser displacement sensor 2 measures in a vertical direction. First, the laser displacement sensor 2 is moved along the guide rail 5 to a non-keyway section, the guide rail 5 is moved horizontally in a direction perpendicular to the axis of the workpiece 1 through the longitudinal moving devices at both ends of the guide rail 5, the values of measuring during the movement are compared, the laser displacement sensor 2 is adjusted to the position of the maximum measured value, that is, a position on the axis of the workpiece, and then the laser displacement sensor 2 is moved along the guide rail 5 to the top of the keyway. A system calculation coordinate system is established, the theoretical point of intersection between the laser and the axis of the shaft-type workpiece is taken as the origin O, with the axis of the shaft-type workpiece as the Z-axis, and the vertical upwards direction of a straight line where the laser is located as the positive direction of the Y-axis. The right-hand rule is used to determine the X-axis, the detection coordinate system O-XYZ is established, and the section detected by the laser displacement sensor is determined as the XOY plane.

The detection data of the laser displacement sensor is made corresponding to the O-XYZ coordinate system. The shaft radius of the keyway section is 20 mm, the laser displacement sensor is located on the axis of the keyway section; assuming that the maximum measured value obtained by the laser displacement sensor when the workpiece rotates by 360 degrees is 22.474 mm, the minimum value is 17.522 mm (excluding the value of the keyway section), and the value of the detection data corresponding to the Y axis is y, then the corresponding relationship is as follows:

$$y = y_c - \frac{22.474 - 17.522}{2}$$

S2: the chuck 3 is controlled to rotate at a given speed, the workpiece 1 is driven to rotate at a constant speed, the real-time detection data of the shaft-type workpiece 1 is acquired through the laser displacement sensor 2, and the data is converted to obtain the measured value y on the Y-axis.

According to the detection results, the rotation angles $\alpha_1'$ and $\alpha_2'$ when the laser displacement sensor detects the vertices of the edges of two keyways are $0.1450\,\pi$ and $0.3380\,\pi$, respectively, and $\alpha_0'$ is $0.2864\,\pi$ $$\rho(\theta) = \begin{cases} \dfrac{20-12}{\sin\theta}, & 0.1450\pi < \theta < 0.3380\pi \\ 20, & \text{Other} \end{cases}$$

The detection curve model after the sensor is offset can be obtained through simultaneous connection.

In view of the actual positioning error of the laser displacement sensor, if the maximum measured value is 19.998 mm, then the compensation angle is calculated as follows:

$$rs = \arccos\frac{19.998}{20} = 0.0045\pi$$

The abscissas of the points A and B are −5.9643 and 5.9774 respectively, and the calculated symmetry error of the detection section is 0.0065 mm.

S3: the laser displacement sensor 2 is moved on the keyway along the Z-axis direction, the detection is repeated several times at different positions, and the symmetry errors of n sections are calculated, to obtain the measured symmetry error of the keyway, namely 0.011, which is close to the actual error, indicating the detection accuracy of this experimental equipment is very high.

TABLE 1

Test data of different sections of a shaft

| SN i | 1 | 2 | 3 | 4 | 5 |
|---|---|---|---|---|---|
| $\delta_i$/mm | 0.0065 | 0.0084 | 0.0087 | 0.0092 | 0.0108 |
| SN i | 6 | 7 | 8 | 9 | 10 |
| $\delta_i$/mm | 0.0099 | 0.0103 | 0.0112 | 0.0074 | 0.0079 |

What is claimed is:

1. A method for in-situ non-contact detection of a symmetry error of a shaft-type workpiece, comprising the following steps:

S1: establishing a detection system, wherein the detection system comprises a guide rail located on the upper side of a machine tool, a laser displacement sensor that is installed on the guide rail and can move laterally along the guide rail, a lateral moving device that is installed on the guide rail to drive the laser displacement sensor to move, a longitudinal moving device that is located on both sides of the guide rail and configured to drive the longitudinal movement of the guide rail, and a machine tool for clamping shaft-type workpieces; measuring with the laser displacement sensor in a vertical direction, first moving the laser displacement sensor along the guide rail to a non-keyway section of the shaft-type workpiece that refers to a part of the shaft-type workpiece in radial direction where there is no keyway, a keyway is a structural feature for connecting shafts and hubs to ensure torque transmission, =making the guide rail move horizontally in a direction perpendicular to the axis of the workpiece through the moving devices at both ends of the guide rail, comparing the values of measuring during the movement, adjusting the laser displacement sensor to the position of the maximum measured value, that is, a position on the axis of the shaft-type workpiece, and then moving the laser displacement sensor along the guide rail to the top of the keyway of the shaft-type workpiece; establishing a system calculation coordinate system, taking a theoretical point of intersection between the laser and the axis of the shaft-type workpiece as origin O, the theoretical point is an intersection point between a laser beam's line of propagation and the axis of the shaft-type workpiece, the axis of the shaft-type workpiece as the Z-axis, and the vertical upwards direction of a straight line wherein the laser is located as the positive direction of the Y-axis, using the right-hand rule to determine the X-axis, establishing the detection coordinate system O-XYZ, and determining the section detected by the laser displacement sensor as the XOY plane;

S2: controlling the machine tool to rotate at a given speed, driving the shaft-type workpiece to rotate at a constant speed, acquiring the real-time detection data of the shaft-type workpiece through the laser displacement sensor, and converting the data to obtain the measured value y on the Y-axis;

on the rectangular coordinate system X-O-Y of the section, when the bottom of the keyway is horizontal, the mathematical model for the cross-section contour line of the keyway can be expressed as:

$$\rho(\theta) = \begin{cases} \dfrac{R-b}{\sin\theta}, & \dfrac{\pi}{2} - \arcsin\dfrac{a+\delta_0}{R} < \theta < \dfrac{\pi}{2} + \arcsin\dfrac{a-\delta_0}{R} \\ R, & \text{Other} \end{cases} \quad (2)$$

Wherein R is the radius of the shaft, b is the depth of the keyway, $\theta$ is the polar angle, $\rho$ is the polar radius, $\rho(\theta)$ is a function of polar radius and polar angle, =2a is the width of the keyway, $\delta_0$ is the symmetry error of the keyway actually existing in this section, and $\delta_0$ is 0 when there is no symmetry error;

under the rectangular coordinate system X-O-Y of the section, the coordinates of a point $(x_0, y_0)$ on the contour after rotating the angle $\alpha$ counterclockwise around the origin are (x, y) and the conversion formula is as follows:

$$\begin{bmatrix} x \\ y \end{bmatrix} = \begin{bmatrix} \cos\alpha & -\sin\alpha \\ \sin\alpha & \cos\alpha \end{bmatrix} \begin{bmatrix} x_0 \\ y_0 \end{bmatrix} \quad (3)$$

the detection trajectory equation obtained by the laser displacement sensor can be regarded as the original curve equation (2) wherein the curve intersects with the Y-axis at a positive value point after rotation by 360 degrees, the coordinates of the intersection points between the keyway cross-sectional profile line and the Y-axis form an intersection curve, and the model expression is as follows:

$$\begin{cases} \begin{bmatrix} x \\ y \end{bmatrix} = \begin{bmatrix} \cos\alpha & -\sin\alpha \\ \sin\alpha & \cos\alpha \end{bmatrix} \begin{bmatrix} \rho(\theta)\cos\theta \\ \rho(\theta)\sin\theta \end{bmatrix} \\ x = 0 \end{cases} \quad (4)$$

two numerical mutation points A and B existing in the detection trajectory are the left and right edge points of the keyway, and their rotation angles are respectively set as $\alpha_1$ and $\alpha_2$ and $\alpha_1 < \alpha_2$; if $\alpha_0$ is the rotation angle when the value in the trajectory is the smallest, then the bottom of the keyway is just parallel to the X-axis at this moment, that is, regardless of the initial position of the axis, if the axis is rotated counterclockwise by an angle of $\alpha_0$, the bottom of the keyway can be kept horizontal; at this position, the coordinates for the two ends of the keyway can be calculated; at this time, points A and B are distributed on both sides of the y-axis, and the calculation formulas of the abscissa are respectively as follows:

$$x_A = R\sin(\alpha_1 - \alpha_0)$$

$$x_B = R\sin(\alpha_2 - \alpha_0) \quad (5)$$

$x_A$ is the abscissa of the point A, and $x_B$ is the abscissa of the point B;

the abscissa of the central point of the keyway is calculated according to the abscissas of the points A and B, the difference between the abscissa and the ideal coordinate is the symmetry error, and the calculation formula is as follows:

$$\delta_1 = \frac{x_A + x_B}{2} - 0 \quad (6)$$

when the laser displacement sensor is installed, there exists a positioning error along the X direction, and when the laser displacement sensor is offset by a distance l in the x direction, a detection line becomes x=l in the rectangular coordinate system X-O-Y of the section; the trajectory of the keyway section is determined by the rotation angle wherein the points A and B are detected by the detection light; according to the theory of space geometry, the trajectory of the non-keyway section remains unchanged, and the value of the detection line in the formula (4) is changed from x=0 to x=l, to obtain the rotation angles of the points A and B; at this time, an equation of the trajectory in 360 degrees can be expressed as follows:

$$\_\rho(\theta) = \begin{cases} \frac{R-b}{\sin\theta}, & \alpha_1' < \theta < \alpha_2' \\ R, & \text{Other} \end{cases} \quad (7)$$

$\alpha_1'$ and $\alpha_2'$ are the rotation angles when the laser displacement sensor detects the vertices of the edges of two keyways respectively, R is a variable of the radius of the shaft, b is the depth of the keyway, and the detection curve model after the sensor is offset can be obtained through simultaneous connection;

when the y value is R-b and the point after the lowest point is a horizontal time point, the rotation angle is $\alpha_0'$;

the laser displacement sensor has a deviation along the x-axis direction, and its measured maximum and minimum values are changed; if the maximum value detected after the offset is $R_{max}$, $R_{max}$ will be smaller than the section radius R, an offset in the rotation angles of the points A and B will be compensated, and the compensation formula is as follows:

$$rs = \arccos\frac{R_{max}}{R} \quad (8)$$

rs is the compensation angle;

the compensation angle is used to eliminate the influence from the horizontal offset of the laser displacement sensor, and the formula for calculating the abscissas of the points A and B is as follows:

$$x_A = R\sin(\alpha_1' - \alpha_0' + rs)$$

$$x_B = R\sin(\alpha_2' - \alpha_0' + rs) \quad (9)$$

$x_A$ and $x_B$ are substituted into the formula (6) to obtain the calculated value of the symmetry error of the section after eliminating the sensor offset error;

S3: moving the laser displacement sensor on the keyway along the Z-axis direction, repeating the detection several times at different positions, and calculating the symmetry errors of n sections, wherein the maximum error is the symmetry error of the keyway, and the expression is as follows:

$$\delta = \max(\delta_i), i = 1, 2, \ldots n \quad (10)$$

$\delta_i$ is the calculated symmetry error of the $i^{th}$ section, and $\delta$ is the symmetry error of the shaft keyway.

2. The method for in-situ non-contact detection of a symmetry error of a shaft-type workpiece according to claim 1, wherein the method of acquiring the real-time detection data of the shaft-type workpiece through the laser displacement sensor and converting the data to obtain the measured value y on the Y-axis in S2 is specifically as follows:

the detection data of the laser displacement sensor is made corresponding to the O-XYZ coordinate system, and the laser displacement sensor is located on the axis of the keyway section; assuming that the measured value obtained by the laser displacement sensor when the workpiece rotates by 360 degrees is $y_c$, the maximum value is $y_{cmax}$, the minimum value is $y_{cmin}$ (excluding the value of the keyway section), and the value of the detection data corresponding to the Y axis is y, then the corresponding relationship is as follows:

$$y = y_c - \frac{y_{cmax} - y_{cmin}}{2}. \quad (1)$$

3. The method for in-situ non-contact detection of a symmetry error of a shaft-type workpiece according to claim 1, wherein the lateral moving device comprises a horizontal screw rod that is arranged parallelly below the guide rail, a horizontal motor that is connected to the guide rail and configured to drive the horizontal screw rod to rotate, the laser displacement sensor is fixed on a ball nut seat of the horizontal screw rod, and the horizontal motor drives the horizontal screw rod to rotate, so as to drive the laser displacement sensor to move laterally along the guide rail.

4. The method for in-situ non-contact detection of a symmetry error of a shaft-type workpiece according to claim 1, wherein the longitudinal moving device comprises two parallel longitudinal screw rods symmetrically arranged on both sides of the guide rail and a longitudinal motor that is located at the end of the longitudinal screw rod and configured to drive the rotation of the longitudinal screw rod, the two ends of the guide rail are fixed on the ball nut seat of the longitudinal screw rod on both sides, and the longitudinal motor synchronously drives the rotation of the longitudinal screw rods on both sides, and drives the guide rail to move along the longitudinal screw rod.

5. The method for in-situ non-contact detection of a symmetry error of a shaft-type workpiece according to claim 1, wherein the machine tool comprises a chuck for clamping the shaft-type workpieces and a tip for tightening the shaft-type workpieces, and the rotation of the chuck is controlled to drive the shaft-type workpieces to rotate at a constant speed.

* * * * *